March 14, 1961  E. J. SCHAEFER  2,975,347
LIQUID LEVEL CONTROL SYSTEM
Filed May 6, 1957  2 Sheets-Sheet 1

INVENTOR.
Edward J. Schaefer,
BY
Davis, Lindsey, Hibben & Noyes
Atty's.

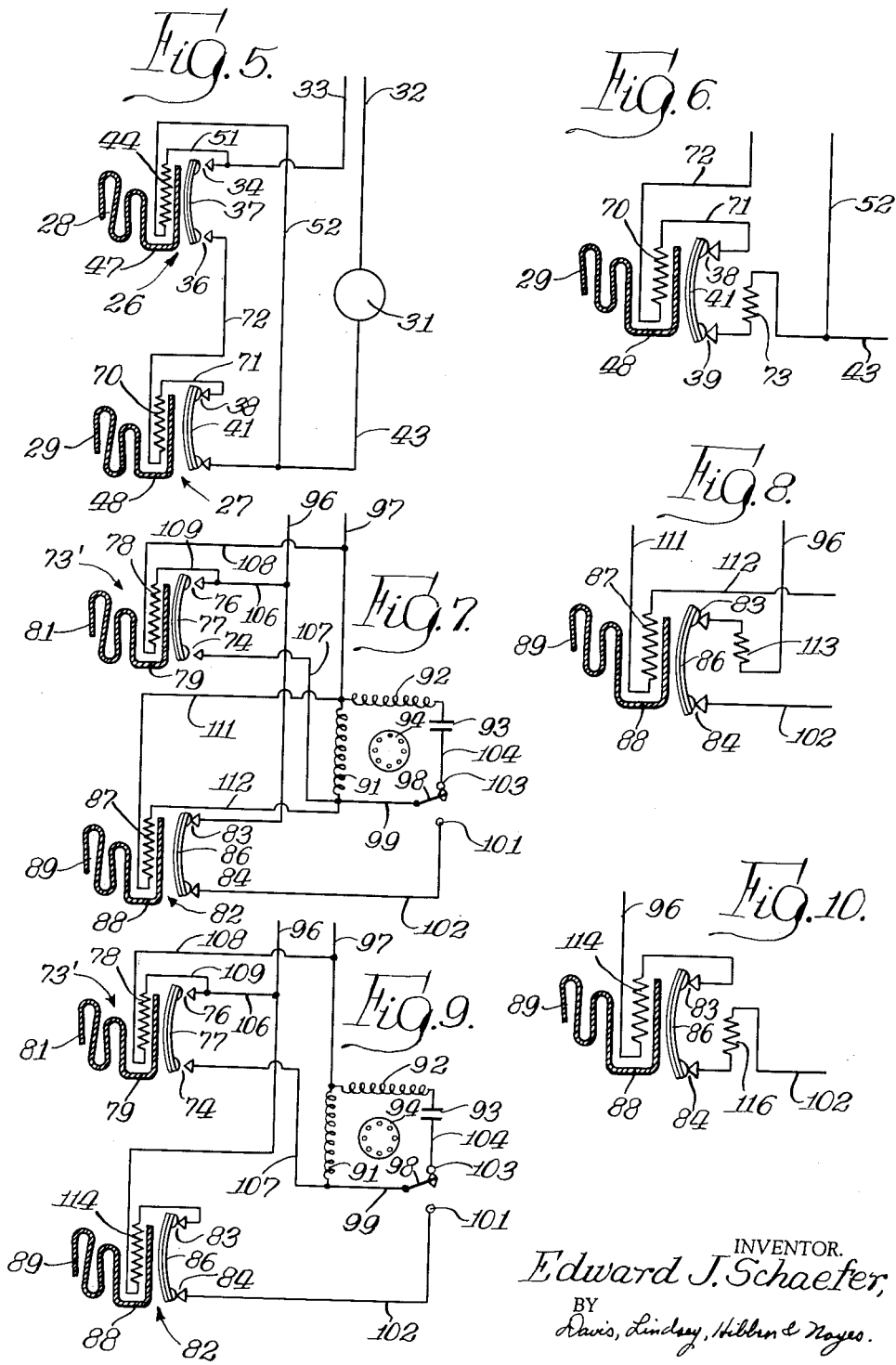

United States Patent Office 2,975,347
Patented Mar. 14, 1961

2,975,347

LIQUID LEVEL CONTROL SYSTEM

Edward J. Schaefer, Fort Wayne, Ind. (Franklin Electric Co. Inc., 400 E. Spring St., Bluffton, Ind.)

Filed May 6, 1957, Ser. No. 657,440

14 Claims. (Cl. 318—240)

This invention relates to a novel liquid level control system and more particularly to a novel control circuit for a pump motor combination.

In a pumping system wherein liquid is pumped out of or into a container, vessel, sump, or the like, it is frequently desirable to maintain the liquid level either above or below a certain predetermined point. This goal is accomplished most conveniently by providing control means for automatically starting and stopping the pump motor in response to different predetermined liquid level conditions. For example, in a sump pump it is common practice to provide a control device, such as a pressure switch or a float control, which is responsive to changes in liquid level in the sump for starting the motor at a predetermined maximum liquid level in the sump and stopping the motor at a predetermined minimum liquid level in the sump. My prior U.S. Patent No. 2,662,206, issued December 8, 1953, relates to one particularly advantageous sump pump unit of a submersible type wherein the motor enclosure also functions as a float chamber.

Many of the liquid level control systems heretofore known require the use of either external moving parts, such as are found in a float control, or a pressure responsive switch including a diaphragm or the like. The present invention relies solely on electrical components and heat conducting elements for control purposes thereby eliminating the need for external moving parts and diaphragms or other pressure sensitive elements. The present invention, therefore, provides a highly simplified and relatively inexpensive control system which offers several advantages and operating features not heretofore available in liquid level control devices.

Accordingly, a primary object of the present invention is to provide a novel and improved liquid level control system for use with a pump motor which does not require float devices or pressure responsive elements.

A further object of the invention is to provide novel simplified control means for starting and stopping the operation of a pump motor at different predetermined liquid levels.

Another object of the invention is to provide a control system of the foregoing character which utilizes only electrical components and heat conducting elements.

Still another object of the invention is to provide a novel arrangement of thermal switches in a pump motor circuit for automatically controlling the operation of the pump motor in response to changes in liquid level.

Other objects and advantages of the invention will become apparent from the subsequent detailed description taken in conjunction with the accompanying drawings, wherein:

Fig. 5 is a schematic diagram similar to Fig. 2 showing a modification of the circuit;

Fig. 6 is a fragmentary view showing a further modification of one portion of the Fig. 5 circuit;

Fig. 7 is a schematic diagram showing another type of control circuit which includes the speed responsive switch of the motor;

Fig. 8 is a fragmentary diagram showing a modification of one part of the Fig. 7 circuit;

Fig. 9 is a schematic circuit diagram showing a variation of the Fig. 7 circuit; and Fig. 10 is a fragmentary view showing a modification of one part of the Fig. 9 circuit.

In my copending application Serial No. 614,205 filed October 5, 1956, a combined overload and low liquid protector device for submersible pump motors is described wherein a thermal switch is included in the motor circuit with an auxiliary heater arranged in physical proximity to the switch and connected so that the heater is energizsed at all times when the motor is connected to the line. However, a heat conducting shield is also provided which cooperates between the auxiliary heating element and the liquid being pumped so that as long as pumped liquid is in contact with the heat conducting shield, the cooling effect of the liquid is sufficient to dissipate the heat evolved by the heating element thereby normally preventing opening of the thermal switch by the heating element. However, in the absence of pumped liquid in contact with the heat conducting shield, the heat evolved by the heating element is sufficient to actuate the thermal switch which disconnects the motor. The present invention utilizes the same general principle by providing two thermal switches located at different positions corresponding to two different predetermined liquid levels and each thermal switch has a heating element and a heat conducting element arranged to be cooled by liquid until the liquid level falls below the exposed heat conducting element. Consequently, the operation of the pump motor is controlled by the presence or absence of cooling liquid at the two different liquid level control points.

Figure 1:
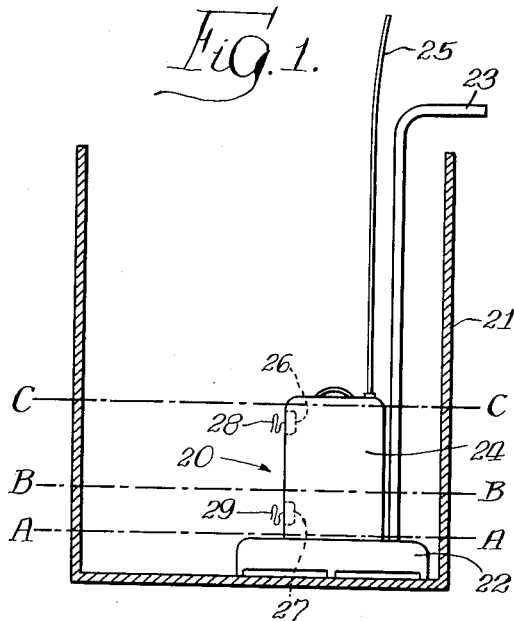
Fig. 1 is an elevational view, partly in section, of a submersible pump motor arrangement embodying one specific form of the invention and located in a sump.

Referring first to Fig. 1, the invention is illustrated in connection with a submersible pump motor unit indicated generally at 20 which is located within a sump 21 adapted to contain a liquid such as water. The pump motor unit includes a pump portion 22 having a discharge conduit 23 and an electric motor contained within a fluid tight casing or enclosure 24 and having an electric conductor cable 25 extending therefrom. As hereinafter described in more detail, the electric motor circuit includes a pair of thermal switch devices designated generally at 26 and 27 and having heat conducting elements 28 and 29, respectively, which project through the motor enclosure 24 in exposed relation within the sump 21 for contact with liquid contained therein. The general mode of operation is as follows. When the liquid level in the sump is at the position designated by the broken line A—A below the heat conducting element 29 of the lowermost thermal switch 27, the pump motor is inoperative. As the liquid level in the sump rises to the point indicated by the broken line B—B in Fig. 1, the heat conducting element 29 is submerged in liquid but this causes no change in the system and the pump motor still remains inoperative. However, when the liquid level rises to some predetermined point, such as indicated by the broken line C—C, above the heat conducting element 28 of the uppermost thermal switch 26, the pump motor is automatically started as a result of the cooling effect of the liquid on the submerged heat conducting element 28. As the liquid is pumped out of the sump and the level falls to the point B—B, the cooling effect on the uppermost thermal switch 26 is lost but, nevertheless, the pump motor continues to operate. Finally when the liquid level in the sump recedes to a predetermined point such as the line A—A below the lowermost thermal switch 27, the motor is disconnected as a result of the loss of cooling effect on the switch 27 and the pump motor is thereby stopped.

Figure 2:
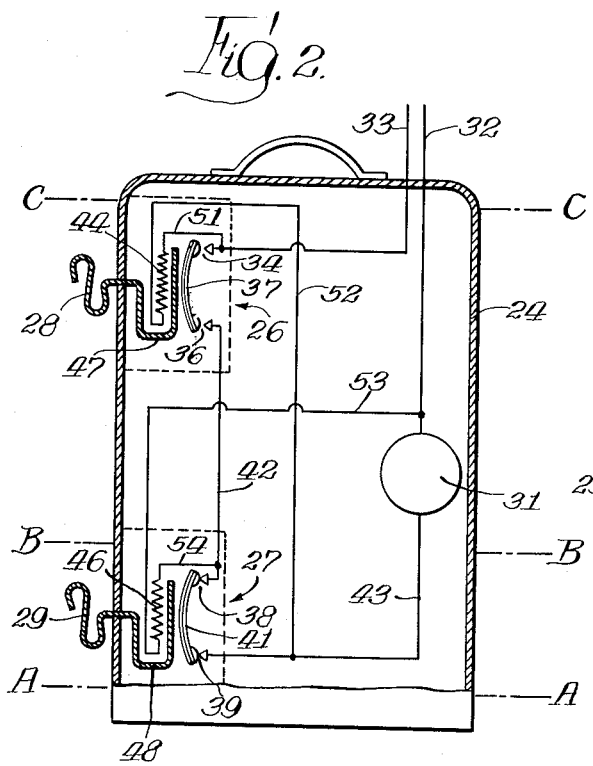
Fig. 2 is an enlarged schematic diagram showing the details of the control circuit for the pump motor of Fig. 1.

Referring now to Fig. 2, the details of a preferred circuit arrangement for accomplishing the above-mentioned operating sequence will now be described. The electric motor, designated at 31, may be of any suitable type, e.g. an induction motor having a squirrel cage rotor and field windings, and is adapted to be connected to a power source through a pair of line conductors 32 and 33. The conductor 32 extends directly to the winding or windings (not shown) of the motor 31 and the conductor 33 is connected to the motor 31 through the thermal switches 26 and 27 in series relation. Thus, the upper thermal switch 26 has a pair of stationary contacts 34 and 36 which are adapted to be bridged by a bimetallic element 37, and the thermal switch 27 has a pair of stationary contacts 38 and 39 adapted to be bridged by a bimetallic element 41. The conductor 33 extends to the contact 34, and the motor circuit is completed by a line 42 interconnecting the contacts 36 and 38 and by a line 43 extending from the contact 39 to the motor 31.

The thermal switches 26 and 27 are provided with high resistance shunt heaters 44 and 46 arranged in physical proximity to the respective bimetallic elements 37 and 41 for affecting the latter under certain operating conditions. However, the bimetallic elements 37 and 41 are shielded from their respective heaters 44 and 46 by means of metallic heat conducting shields indicated diagrammatically at 47 and 48, respectively. The shields 47 and 48 extend through the wall of the liquid tight motor enclosure 24 to provide the exposed portions 28 and 29 heretofore mentioned. The heater element 44 of the upper thermal switch 26 is connected in parallel across the series connected switches 26 and 27 and in series with the motor 31 by means of a line 51 extending to the conductor 33 and a line 52 extending to the line 43. The heater 46 of the lower thermal switch 27, on the other hand, is connected across the line and in series with the upper set of switch contacts 34—36 by means of a line 53 extending to the conductor 32 and a line 54 extending to the line 42. Thus, the heater 46 is energized only when the switch contacts 34—36 of the thermal heater 26 are closed by the bimetallic bridging element 37.

The operation of the device will now be set forth. Before the device is connected to the power source, the contacts 34—36 and 38—39 of both thermal switches will be in closed position. Therefore, when the device is first connected to the power source, the motor will be energized through a circuit path as follows: conductor 32, motor 31, line 43, closed contacts 38—39 of switch 27, line 42, closed contacts 34—36 of switch 26, and conductor 33. Consequently, the motor starts immediately even if no water is present in the sump. Because of the lower resistance of the motor energizing circuit as just described, there is insufficient current flow through the high resistance heater 44 to cause energization of the latter. However, the heater 46 is energized through a path comprising conductor 32, line 53, heater 46, line 54, line 42, closed contacts 34—36 of the thermal switch 26, and conductor 33. Assuming that no liquid is present in the sump and there is, therefore, inadequate cooling of the exposed heat conducting element 29, the heater 46 soon heats up sufficiently to actuate the bimetallic element 41 and open the contacts 38—39 of the thermal switch 27 thereby interrupting the motor circuit and stopping the motor 31. At this point the heater 46 remains energized for holding the switch 27 in open position, but at the same time heater 44 is now placed in series circuit with the motor through the following path: conductor 32, motor 31, line 43, line 52, heater 44, line 51, and conductor 33. Because the heater 44 is a high resistance element, insufficient current flows through this path to energize the motor 31 but nevertheless the current flow is now sufficient to energize the heater 44 which gradually heats up because there is no cooling liquid present to dissipate the heat through the heat conducting element 28. As a result, after a further short time the bimetallic element 37 is actuated to open the switch contacts 34—36 of the thermal switch 26 and the result of this is to disrupt the circuit for the heater 46 which is in series with the switch contacts 34—36. Consequently, the heater 46 is immediately deenergized and the bimetallic element 41 gradually cools so as to reclose the contacts 38—39 of the thermal switch 27. The device is now in the condition shown in Fig 2 and is ready for automatic control of the sump pump. In other words, the heater 46 is deenergized and the switch 27 is closed while the heater 44 is energized sufficiently to hold the thermal switch 26 open but the current flowing through the circuit for the high resistance heater 44 is insufficient to operate the motor 31.

When water accumulates in the sump 21 and the level rises to the line B—B, the heat conducting element 29 is immersed in liquid but the cooling effect produces no change at this time since the switch 27 is already closed. However, as the liquid level continues to rise and eventually reaches the line C—C so that the heat conducting element 28 is immersed and cooled, the heat evolved by the heater 44 will be dissipated by the cooling effect of the liquid through the shield 47 and its heat conducting portion 28 so that the contacts 34—36 of the thermal switch 26 are closed by the bimetallic element 37. The motor 31 is thus energized through 32, 31, 43, 38—39, 42, 34—36, and 33 so that the pump 22 is started. As liquid is pumped out of the sump the level begins to drop until it falls below the heat conducting element 28 of the upper thermal switch 26. However, the loss of cooling effect on the heat conducting element 28 produces no change at this time because as long as both thermal switches 26 and 27 are closed for energizing the motor through its relatively low resistance circuit, there is insufficient passage of current through the circuit for the high resistance heater 44 to energize the same. At the same time, the switch 27 remains closed in spite of the fact that the heater 46 is energized because of the cooling effect of the liquid on the heat conducting element 29. Consequently, the motor 31 continues to run until the liquid level drops to the line A—A so as to expose the heat conducting element 29. The loss of cooling effect on the element 29 permits the heater 46 to effect opening of the thermal switch 27 thereby stopping the motor 31 and terminating the pumping operation. The heater 46 remains energized temporarily but the opening of the switch 27 places the heater 44 in the energizing circuit heretofore described, namely 32, 31, 43, 52, 44, 51 and 33 so that in a short time the switch 26 is opened thereby disrupting the circuit for the heater 46 and permitting the thermal switch 27 to cool off and reclose. The device is thereby restored to the condition shown in Fig. 2 and is ready for the next operating sequence.

Figure 3:
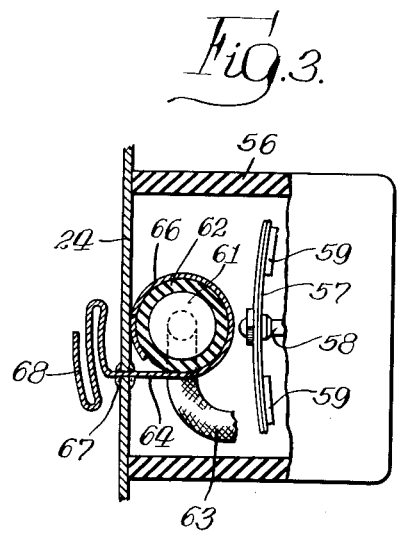
Fig. 3 is a fragmentary sectional view showing the structural details of one form of one of the thermal switch components of the Fig. 2 circuit.

The thermal switches 26 and 27 may have any suitable construction, the structure being of either type shown in my aforementioned copending application Serial No. 614,205 The structural details of one device which is particularly advantageous is shown in Fig. 3. The switch components are contained in a cup-shaped housing 56 of plastic or other insulating material which is preferably mounted (by means not shown) at the interior surface of the motor enclosure 24. A bimetallic disk 57 is supported in the housing by a screw 58 and is provided with contact portions 59 arranged in coacting relation with the stationary switch contacts (not shown) corresponding to the elements 34—36 or 38—39 in Fig. 2. The high resistance heater for actuating the bimetallic disk 57 is in the form of a cartridge type shunt heating element 61 contained within an insulating tube 62 and is disposed within the skirt portion of the housing 56 in physical proximity to the bimetallic disk 57 so as to be capable of actuating the latter. A pair of electrical conductors, one of which is shown at 63 in Fig. 3, extend from the opposite ends of the heater 61 for connecting the same in the circuit. The heat evolved by the heating element 61 is adapted to be removed by a combined shield and heat conducting element, which is shown in Fig. 3, may be in the form of an elongated strip 64 of metal such as copper having a relatively high heat conductivity. One end of the strip 64 is curled, as at 66, to provide a sheath around the insulating tube 62 and the other end of the strip 64 projects from the housing 56 through the wall of the motor enclosure 24 with a fluid tight seal such as a soldered connection 67 being provided therebetween. The outer exposed end of the strip 64 may be folded upon itself several times, as at 68, for the sake of compactness.

It will, of course, be understood by those skilled in the art that in order to obtain the mode of operation described hereinabove, it will be necessary to achieve a proper balance between the heating effect of the heaters 44 and 46 and the cooling effect of the sump liquid on the heat conducting elements 28 and 29. Among other factors, the desired balance will be obtained by careful selection of the heating elements and by regulating the extent of the exposed cooling surface on the projecting heat conducting elements 28 and 29.

Figure 4:
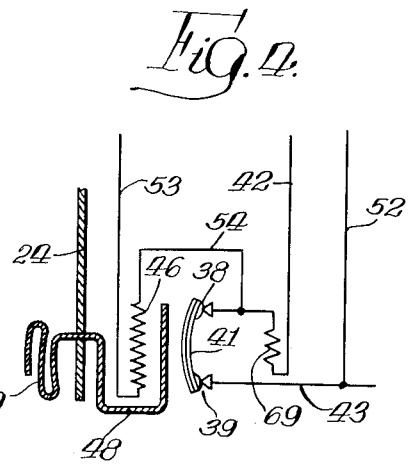
Fig. 4 is a fragmentary view showing a modification of one part of the circuit of Fig. 2.

In Fig. 4 a modification of the thermal switch 27 in the Fig. 2 embodiment is shown. This modification comprises the addition of a small low resistance series type heating element 69 in the motor circuit for overload protection purposes. In this case, an unshielded heating element 69 is interposed in the line 42 and is located in physical proximity to the bimetallic disk 41 so as to actuate the latter under certain circumstances. For example, if during operation of the motor 31 an overload condition is encountered for any reason, the excessive current drawn by the motor will cause the heating element 69 to heat up, and since the heater 69 is unshielded the heat evolved will cause the bimetallic disk 41 to open the thermal switch 27 and disconnect the motor regardless of any cooling effect which the sump liquid may have on the heaters 44 and 46. Thus, it will be seen that the combination of the switch contacts 38—39, the bimetallic element 41, and the series heater 69 constitute in effect a conventional overload protector for the motor.

Fig. 5 comprises an arrangement generally similar to the circuit shown in Fig. 2 with the exception that the lowermost thermal switch 27 is provided with a low resistance series heating element 70 in place of the high resistance shunt heater 46 shown in Fig. 2. For simplicity, the parts of the circuit which are the same have been given the same reference numeral as in Fig. 2. The series heating element 70 for the thermal switch 27 is connected in series between the stationary switch contacts 38 and 36 by means of a line 71 and a line 72, repsectively. Otherwise, the circuit connections are the same as in Fig. 2.

When the Fig. 5 arrangement is first connected to a power source with no water present in the sump, the switches 26 and 27 will be in closed position and the motor 31 will be started through a circuit comprising conductor 32, motor 31, line 43, contacts 38—39, line 71, heater 70, line 72, contacts 34—36 and conductor 33. As long as both switches 26 and 27 remain closed, there will not be sufficient current flowing through the high resistance heater 44 to energize the same. However, because of the absence of cooling liquid in the sump, the series heater 70 quickly heats up and opens the thermal switch 27 thereby disconnecting and stopping the motor 31. At this point, full line voltage is applied across heater 44 through a circuit comprising conductor 32, motor 31, line 43, line 52, heater 44, line 51, and conductor 33. Although the current passing through this circuit is insufficient to operate the motor 31, the heater 44 soon heats up and opens the switch 26. In the meantime, however, the heater 70 having been de-energized upon opening of the switch 27, the latter gradually cools off and recloses so that the device is then in the condition shown in Fig. 5 with the thermal switch 26 open, the thermal switch 27 closed, and the motor 31 stopped. In this condition the device is ready to function for level control purposes.

As will readily be understood, when the water level in the sump rises sufficiently to cool the element 28, the switch 26 will then close and start the pump motor. When the water level finally drops below the switch 27 so that the cooling effect on the element 29 is lost, the heater 70 will effect opening of the thermal switch 27 to shut off the motor. Of course, up to this point the heater 44 has been rendered ineffective by the fact that both switches 26 and 27 were closed during operation of the motor 31. However, upon opening of the switch 27, the heater 44 is energized and the upper thermal switch 26 will eventually open. Thereafter the heater 70 will have cooled sufficiently to permit reclosing of the switch 27 and the device is thereby restored to its Fig. 5 condition for the next operating sequence.

Fig. 6 is the same as Fig. 5 with the exception that an additional low resistance series heater 73 has been added to the thermal switch 27, the heater 73 being unshielded and being interposed in the line 43 and located in physical proximity to the bimetallic element 41 for providing overload protection for the motor in the same general manner as described in connection with Fig. 4.

Fig. 7 constitutes a further modification of the invention wherein the motor has a speed responsive switch the contacts of which are included in the liquid level control circuit. Two thermal switches with shielded high resistance heaters are again employed for level control purposes just as in Figs. 2 and 5. Thus, the uppermost thermal switch designated generally at 73' has a pair of fixed contacts 74 and 76, a bimetallic bridging element 77, a potential heater 78 in physical proximity to the bimetallic element 77, and a heat conducting shield 79 having an exposed heat conducting portion 81. The lowermost thermal switch designated generally at 82 has a pair of fixed contacts 83 and 84, a bimetallic bridging element 86, a potential heater 87 in physical proximity to the bimetallic element 86, and a shield 88 having an exposed heat conducting portion 89. The motor is of the single phase split phase capacitor start type having a running winding 91, a starting winding 92, a capacitor 93 and an induction rotor 94. A pair of conductors 96 and 97 extend from a power source and the conductor 97 is connected to both of the windings 91 and 92. The motor also has a speed responsive centrifugal switch 98 which is connected to the opposite end of the running winding by a line 99. The switch 98 is cooperable with a running contact 101 connected by a line 102 to the thermal switch contact 84 and a starting contact 103 which is connected to the opposite end of the starting winding 92 by a line 104 having the capacitor 93 interposed therein. The line conductor 96 extends to the thermal switch contact 83 and is also connected to the thermal switch contact 76 by a line 106. The remaining contact 74 of the thermal switch 73' is connected to the running winding 91 by a line 107. The potential heater 78 of the upper thermal switch 73' is connected across the line so that it is always energized by means of a line 108 extending to the conductor 97 and a line 109 extending to the line 106. The potential heater 87 of the thermal switch 82 is connected across the running winding 91 of the motor by means of lines 111 and 112 so that the heater 87 is always energized as long as the motor is running.

The operation of the Fig. 7 arrangement will now be described. When the unit is connected to a source of power with the sump empty, the thermal switches 73' and 82 will, of course, be closed and the centrifugal switch 98 will be in engagement with the starting contact 103. Consequently, both the starting and running windings will be energized through a path including the conductor 96, line 106, switch contacts 74—76, and line 107. When the motor comes up to speed, the centrifugal switch 98 will engage the running contact 101 thereby cutting out the starting winding 92 and the motor will continue to run with current being supplied through a path 97, 91, 107, 74—76, 106, and 96 and also through a parallel path comprising conductor 97, running winding 91, line 99, centrifugal switch 98, the running contact 101, line 102, contacts 83—84, and conductor 96. In the meantime, however, sufficient current is diverted through the high resistance heater 87 to energize the same. Consequently, the heater 87 heats up and the bimetallic element 86 is thereby actuated for opening the switch contacts 83—84 of the thermal switch 82. However, at this point the motor continues to run through the parallel circuit 97, 91, 107, 74—76, 106, and 96. In the meantime, the potential heater 78 which is connected across the line gradually heats up and actuates the bimetallic element 77 for opening the contacts 74—76 of the thermal switch 73. With both both switches 73' and 82 open, the motor is deenergized and comes to a stop with the centrifugal switch 98 returning to the starting contact 103 as the motor speed decreases. However, since the heater 87 is deenergized simultaneously with the disconnection of the motor winding 91 by opening of the switch 73', it will be seen that the bimetallic element 86 cools off and the switch 82 recloses. The switch 73' remains open because the heater 78 is connected across the line and remains energized as long as the unit is connected to a source of power. The circuit is now in the condition illustrated in Fig. 7 and is ready for level control operation.

As the liquid level in the sump rises it will eventually effect cooling of the switch 73' to close the same and thereby start the pump motor. As the liquid level recedes below the uppermost switch 73' the loss of cooling effect on the heat conducting element 81 causes the switch 73' to open but the pump motor continues to run because the motor is energized through the parallel circuit including the closed switch 82. Finally, when the water level recedes below the switch 82 and the cooling effect is lost, switch 82 will then open thereby disconnecting and stopping the motor. The opening of switch 82 also deenergizes the heater 87 so that the switch 82 gradually cools off and recloses to restore the device to its Fig. 7 condition for the next operating sequence.

Fig. 8 is identical with Fig. 7 with the exception that a low resistance series heating element 113 has been interposed in the line 96 with the heater 113 in physical proximity to the bimetallic element 86. As will be understood from the previous description, the addition of the heating element 113 allows the thermal switch 82 to function also as an overload protector when the motor is running.

Fig. 9 is a modification of the circuit shown in Fig. 7 in that the high resistance heater 87 of Fig. 7 has been replaced by a low resistance series heater 114 which is interposed in the line 96 extending from the switch contact 83 to the source. When the Fig. 9 device is connected to a power source with the sump empty, the pump motor starts up immediately because the starting and running windings of the motor are energized through 97 and through a circuit path comprising 96, 106, 74—76, and 107. As the motor comes up to speed, the centrifugal switch 98 goes over to the running contact 101 thereby cutting out the starting winding and establishing the additional parallel circuit for energization of the motor as follows: 97, 91, 99, 98, 101, 102, 83—84, 114, and 96. The heater 114 which is in series circuit heats up rapidly since there is no cooling of the heat conducting portion 89 and the switch 82 opens. The motor continues to run through the other circuit including the switch 73'. However, the heater 78 being connected across the line gradually heats up and effects opening of the switch 73' thereby stopping the motor. In the meantime the heater 114, which was deenergized upon opening of the switch 82, cools off and the switch 82 recloses. In addition, the centrifugal switch 98 has, of course, returned to the starting contact 103 and the device is now in the condition shown in Fig. 9 and is ready for level control operation.

The level control operation is generally the same as heretofore described. When the water level rises sufficiently to effect cooling of the heat conducting element 81, the thermal switch 73' closes and the pump motor starts up. When the water level recedes below the heat conducting element 81, the upper thermal switch 73' opens but the motor continues to run through the other parallel circuit including the thermal switch 82. Finally, when the liquid level recedes below the heat conducting element 89, the heater 114 heats up and opens the lower thermal switch 82 thereby stopping the motor. At the same time, the heater 114 is deenergized so that upon cooling the switch 82 recloses to restore the device to its Fig. 9 condition.

Fig. 10 is identical with Fig. 9 except for the inclusion of overload protection in the lower thermal switch 82 by interposing a low resistance series heater 116 in the line 102 and disposing the same in unshielded physical proximity to the bimetallic element 86.

From the foregoing, it will be seen that the invention provides a very simple and inexpensive level control system which is particularly useful with submersible pump motors. The control device depends entirely on the use of a pair of thermal switches and does not require external moving parts such as float controls or deflectable diaphragms or other pressure responsive elements. Moreover, the arrangement lends itself readily to the inclusion of overload protection in one of the thermal switches so that the motor is protected against overload during running.

Although the invention has been described with particular reference to certain specific embodiments thereof, it is to be understood that various modifications and equivalents may be resorted to without departing from the scope of the invention as defined in the appended claims.

I claim:

1. A liquid level control system for starting and stopping a pump arrangement at different predetermined liquid levels, said system comprising in combination an electric motor having at least one winding connected in a circuit, a pair of heat responsive switches, means for connecting said switches in series with said winding, a pair of heating elements in physical proximity to the respective switches, and a pair of shields in physical proximity to said switches and heating elements, said switches and their associated shields and heating elements being located at different positions corresponding to said different levels and said shields being exposed to be cooled by the liquid, one of said heating elements being operative for holding one of said switches open during both the operating and rest condition of the motor, said one switch being closable upon cooling of its associated shield when the liquid reaches one of said levels to thereby connect said winding in the circuit to thus operate the motor, and said other heating element being energizable upon closing of said one switch and running of the motor and being operative upon loss of cooling of its associated shield when the liquid reaches the other of said levels to open said other switch for disconnecting said winding and stopping the motor.

2. A liquid level control system for starting and stopping a pump arrangement at predetermined upper and lower liquid levels, said system comprising in combination an electric motor having at least one winding connected in a circuit, a pair of heat responsive switches, means for connecting said switches in series with said winding, a pair of heating elements in physical proximity to the respective switches, means for connecting one of said heating elements to be energized during both the operating and rest condition of the motor for holding one of said switches in open condition, means for connecting the other of said heating elements to be energized in response to closing of said one switch, the other of said switches being biased closed, and a pair of heat conducting elements associated with the respective switches and heating elements and exposed for contact with liquid to conduct heat from the heating elements for preventing actuation of the respective switches, said switches being located at upper and lower positions corresponding approximately to said upper and lower levels with the associated heat conducting eelments being cooled by the liquid until the liquid level falls below the respective positions, said one switch being closable to thereby connect said winding to said circuit and thus operate the motor when the liquid reaches said upper level and thereby effects cooling of the heat conducting element associated with said one heating eelment, and said other switch being operative to disconnect said winding for stopping the motor when the liquid falls below said lower level whereby to discontinue cooling of the heat conducting element associated with said other heating element.

3. A liquid level control system for starting and stopping a pump arrangement at different predetermined liquid levels, said system comprising in combination an electric motor having at least one winding connected in a circuit, a pair of heat responsive switches, means for connecting said switches in series with said winding, said switches being located at different positions corresponding to said different levels, a high resistance heating element in physical proximity to one of said switches, means for connecting said high resistance heating element to be energized during both the operating and rest condition of the motor for holding said one switch in open position, another heating element in physical proximity to the other of said switches, and means for connecting said other heating element to be energized upon closing of said one switch and running of the motor, said one switch being closable to connect said winding in the circuit for operating the motor when the liquid reaches one of said levels and thereby effects cooling of said high resistance heating element, and said other switch being operable to disconnect said winding for stopping the motor when the liquid falls below the other of said levels thereby discontinuing cooling of said other heating element.

4. The system of claim 3 further characterized in that said other heating element also comprises a high resistance heating element connected in shunt relation with said winding.

5. The system of claim 3 further characterized in that said other heating element comprises a low resistance heating element connected in series with said other switch.

6. A liquid level control system for starting and stopping a pump arrangement at different predetermined liquid levels, said system comprising in combination an electric motor having at least one winding connected in a circuit, a pair of heat responsive switches, a first circuit connecting said switches in series with each other and with said winding for energizing the latter, a pair of heating elements in physical proximity to the respective switches, at least one of said elements being a high resistance heating element, a second circuit connecting said one heating element in series with said winding for energizing said one heating element without energizing said winding when said first circuit is disrupted and thereby holding one of said switches in open condition, and means connecting the other of said heating elements to be energized by said first circuit during both the operating and rest condition of the motor, the other of said switches being biased closed, said switches and heating elements being located at different positions corresponding approximately to said different levels, said one switch being closable to close said first circuit to operate the motor when the liquid reaches one of said levels and effects cooling of said one heating element, and said other switch being openable to disrupt said first circuit for stopping the motor when the liquid falls below the other of said levels whereby to discontinue cooling of said other heating element.

7. The system of claim 6 further characterized in that said other heating element comprises a high resistance heating element connected in shunt relation with said winding and in series with said one switch whereby said other heating element is deenergized allowing said other switch to reclose when said one switch is in its normally open condition.

8. The system of claim 6 further characterized in that said other heating element comprises a low resistance series heating element included in said first circuit in series relation with said switches and said winding whereby disruption of said first circuit by opening of said other switch also effects deenergization of said other heating element permitting said other switch to reclose.

9. A liquid level control system for starting and stopping a pump arrangement at different predetermined liquid levels, said system comprising in combination an electric motor having a running winding and a starting winding connected in parallel, speed responsive switch means arranged to disconnect said starting winding at a predetermined speed, a pair of heat responsive switches, said speed responsive switch means being arranged to connect said heat responsive switches in parallel circuits with the running winding at said predetermined speed, a pair of heating elements in physical proximity to the respective switches, at least one of said heating elements being a high resistance heating element, means connecting said one heating element in a circuit for energization thereof at all times when the motor is running or at rest for holding one of said heat responsive switches in open condition, and means connecting the other of said heating elements for energization thereof in at least one of said parallel circuits during running of the motor, said other heat responsive switch being biased closed, said heat responsive switches and heating elements being located at different positions corresponding approximately to said different levels, said one heat responsive switch being closable to energize said windings through one of said parallel circuits and said speed responsive switch for starting the motor when the liquid reaches one of ment, said one heat responsive switch being openable when the liquid falls below said one level but energization of said running winding being continued through said levels and effects cooling of said one heating element said other parallel circuit, and the other of said heat responsive switches being openable to disconnect said running winding for stopping the motor when the liquid falls below the other of said levels whereby to discontinue cooling of the other of said heating elements.

10. The system of claim 9 further characterized in that said other heating element also comprises a high resistance heating element connected across the running winding of the motor so that said other heating element is energized through both of said parallel circuits when the motor reaches running speed.

11. The system of claim 9 further characterized in that said other heating element comprises a low resistance heating element connected in series relation with said other heat responsive switch in said other parallel circuit.

12. In a liquid level control system for a submersible pump unit, the combination of a liquid tight casing enclosing the motor for rendering the same submersible, at least one heat responsive switch mounted inside said casing, said switch being connected in the motor circuit for controlling the operation of the motor, a heating element in physical proximity to said switch and connected for energization thereof under predetermined conditions, and a heat conducting element extending through said casing, said heat conducting element having an internal portion within said casing interposed in shielding relation between said heating element and said switch and having an external portion outside said casing which upon liquid cooling thereof conducts heat from said heating element for preventing actuation of said switch.

13. In a liquid level control system for starting and stopping a submersible pump unit at predetermined upper and lower liquid levels, the combination of a liquid tight casing enclosing the motor for rendering the same submersible, a pair of heat responsive switches mounted inside said casing at upper and lower positions corresponding approximately to said upper and lower levels, said switches being connected in circuit with the motor for controlling the operation of the motor, a pair of heating elements in physical proximity to the respective switches connected for energization thereof under predetermined conditions, and a pair of heat conducting elements associated with the respective heating elements, each of said heat conducting elements extending through said casing and having an internal portion arranged in shielding relation with the corresponding heating element and having an external portion which upon liquid cooling thereof conducts heat from the corresponding heating element for preventing actuation of the associated switch, the cooling or lack of cooling of the external portions of said heat conducting elements by the presence or absence of liquid in contact therewith effecting closing and opening of said switch devices for starting and stopping the operation of the motor in response to changes in liquid level between said upper and lower positions exteriorly of the casing.

14. The structure of claim 13 further characterized in that each of said heat conducting elements comprises a strip of metal having high heat conductivity, the internal portion of said strip being wrapped around the associated heating element and the external portion of said strip being arranged compactly for cooling contact with external liquid.

References Cited in the file of this patent

UNITED STATES PATENTS

| | | |
|---|---|---|
| 1,346,898 | Kingsbury | July 20, 1920 |
| 2,109,169 | Field | Feb. 22, 1938 |
| 2,658,975 | Zuckerman | Nov. 10, 1953 |
| 2,667,178 | Fred et al. | Jan. 26, 1954 |
| 2,739,536 | Schaefer | Mar. 27, 1956 |
| 2,749,495 | Walley | June 5, 1956 |
| 2,824,278 | Johnston | Feb. 18, 1958 |

UNITED STATES PATENT OFFICE
CERTIFICATION OF CORRECTION

Patent No. 2,975,347                                March 14, 1961

Edward J. Schaefer

It is hereby certified that error appears in the above numbered patent requiring correction and that the said Letters Patent should read as corrected below.

Column 5, line 14, for "is" read -- as --; column 7, line 31, for "73" read -- 73' --; same line 31, strike out "both", second occurrence; column 10, line 63, strike out "said levels and effects cooling of said one heating ele-" and insert the same after "one of" in line 59, same column 10; column 11, line 31, after "switches" insert -- and --.

Signed and sealed this 15th day of August 1961.

(SEAL)
Attest:

ERNEST W. SWIDER                              DAVID L. LADD
Attesting Officer                                  Commissioner of Patents